(12) United States Patent
Schillinger et al.

(10) Patent No.: US 10,260,907 B2
(45) Date of Patent: Apr. 16, 2019

(54) NEUTRAL PART FOR A CLIENT-SPECIFIC ADAPTABLE SENSOR

(71) Applicant: Continental Teves AG & Co. oHG, Frankfurt (DE)

(72) Inventors: Jakob Schillinger, Gaimersheim (DE); Dietmar Huber, Rödermark (DE); Lothar Biebricher, Oberursel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 228 days.

(21) Appl. No.: 15/323,525

(22) PCT Filed: Jul. 15, 2015

(86) PCT No.: PCT/EP2015/066160
§ 371 (c)(1),
(2) Date: Jan. 3, 2017

(87) PCT Pub. No.: WO2016/005608
PCT Pub. Date: Jan. 14, 2016

(65) Prior Publication Data
US 2017/0146369 A1    May 25, 2017

(30) Foreign Application Priority Data
Jul. 11, 2014 (DE) .................. 10 2014 213 591

(51) Int. Cl.
*G01D 5/12* (2006.01)
*G01D 5/245* (2006.01)
(Continued)

(52) U.S. Cl.
CPC .............. *G01D 5/245* (2013.01); *G01D 5/16* (2013.01); *G01D 11/245* (2013.01)

(58) Field of Classification Search
CPC ............ G01D 5/16; G01D 5/145; G01D 5/12; G01D 11/245; G01D 5/245–5/2497;
(Continued)

(56) References Cited

U.S. PATENT DOCUMENTS

| 6,034,421 A | 3/2000 | Tokunaga |
| 6,841,989 B2 * | 1/2005 | Goto .................... G01R 33/07 |
| | | 324/117 H |

(Continued)

FOREIGN PATENT DOCUMENTS

| DE | 10146949 | 6/2002 |
| DE | 102011080789 | 2/2012 |

(Continued)

OTHER PUBLICATIONS

International Search Report and Written Opinion for International Application No. PCT/EP2015/066160, dated Dec. 3, 2015, 8 pages.
(Continued)

*Primary Examiner* — Robert R Raevis
(74) *Attorney, Agent, or Firm* — RatnerPrestia

(57) ABSTRACT

A method for producing a sensor includes a circuit carrier which includes an assembly island which supports a sensor circuit for emitting a sensor signal dependent on a physical transmitting field, and an interface which is electrically connected to the assembly island and which transmits the sensor signal to a superordinate signal processing device. The method includes: Enveloping one part of the circuit carrier containing the assembly island and the sensor circuit in a first protective compound; connecting a signal transmission element to the interface; enveloping at least one part of the first protective compound and the interface to at least one part of the signal transmission element connected thereto in a second protective compound.

9 Claims, 10 Drawing Sheets

(51) Int. Cl.
*G01D 5/16* (2006.01)
*G01D 11/24* (2006.01)

(58) Field of Classification Search
CPC .......... G01P 3/487; G01P 3/486; G01P 3/488; G01P 3/481; G01P 3/49; G01P 3/489
USPC ...... 73/865.8, 866.5, 493; 29/595, 841, 855, 29/556
See application file for complete search history.

(56) References Cited

U.S. PATENT DOCUMENTS

| | | |
|---|---|---|
| 8,820,160 B2 | 9/2014 | Doering |
| 9,014,921 B2 | 4/2015 | Bretzigheimer |
| 2004/0118227 A1 | 6/2004 | Tokunaga |
| 2006/0006863 A1* | 1/2006 | Adachi ................. G01C 17/30 324/247 |
| 2007/0126088 A1* | 6/2007 | Frazee ................. G01D 11/245 257/666 |
| 2007/0139044 A1* | 6/2007 | Lamb ................. G01D 11/245 324/252 |
| 2013/0154626 A1 | 6/2013 | Takasaki |
| 2015/0345988 A1 | 12/2015 | Hilgenberg |

FOREIGN PATENT DOCUMENTS

| | | |
|---|---|---|
| DE | 102013226303 | 6/2014 |
| EP | 0282967 | 9/1988 |
| WO | 2010037810 | 4/2010 |

OTHER PUBLICATIONS

German Search Report for German Application No. 10 2014 213 591.5, dated Aug. 6, 2015, including partial English translation, 7 pages.

* cited by examiner

NEUTRAL PART FOR A CLIENT-SPECIFIC ADAPTABLE SENSOR

CROSS REFERENCE TO RELATED APPLICATIONS

This application is the U.S. National Phase Application of PCT International Application No. PCT/EP2015/066160, filed Jul. 15, 2015, which claims priority to German Patent Application No. 10 2014 213 591.5, filed Jul. 11, 2014, the contents of such applications being incorporated by reference herein.

FIELD OF THE INVENTION

The invention relates to a method for producing a sensor circuit and to the sensor circuit.

BACKGROUND OF THE INVENTION

WO 2010/037 810 A1, which is incorporated by reference, discloses a sensor having a sensor circuit which is connected to a wiring carrier, called a base element, during production of the sensor. During production of the sensor circuit, the wiring carrier is held in a holding frame, called a belt, and integrally forms a so-called leadframe with the latter.

SUMMARY OF THE INVENTION

An aspect of the invention is to improve the method for testing sensors.

According to one aspect of the invention, a method for producing a sensor having a circuit carrier, which has a placement island carrying a sensor circuit for outputting a sensor signal dependent on a physical transmitter field and an interface which is electrically connected to the placement island and is intended to transmit the sensor signal to a superordinate signal processing device, comprises the steps of enveloping a part of the circuit carrier containing the placement island and the sensor circuit in a first protective compound, connecting a signal transmission element to the interface, and enveloping at least one part of the first protective compound and the interface, with at least one part of the signal transmission element connected thereto, in a second protective compound.

The stated method is based on the consideration that the sensor must have a mechanical interface in order to fasten the sensor to a superordinate sensor carrier, for example a vehicle. In addition, the sensor also requires an electrical interface in order to feed the sensor signal from the sensor circuit into the signal transmission element which transmits the sensor signal to a superordinate signal processing circuit, for example an engine controller of the above-mentioned vehicle. The mechanical interface is generally formed in a protective compound which protects the electrical interface and the sensor circuit from mechanical stresses and other influences, for example weathering, in order to produce the sensor with as few production steps as possible.

The stated method is also based on the consideration that the mechanical interface must generally be designed in a customer-specific manner because the installation space of the superordinate sensor carrier, such as the above-mentioned vehicle, is dependent on the customer specifications. Sensors which are therefore intended to be installed in superordinate sensor carriers in a small quantity can therefore be produced only with difficulty in mass production.

The stated method starts here with the consideration of separating the practices of enclosing the electrical interface to the sensor circuit in a protective compound and forming a mechanical interface in the protective compound. This initially makes it possible to produce a neutral part for the sensor in which the electrical interface is protected using a protective compound. In this manner, the neutral part for the sensor is transportable and can then be transported to a production plant at which the neutral part for the sensor can be changed to a form adapted to the respective installation space in a customer-specific manner.

For this purpose, the neutral part itself may be produced in a cost-effective manner in mass production independently of the customer-specific form. Only at a very late stage in production does the sensor then need to be adapted, with the customer-specific mechanical interface, to the customer-specific installation space in a more cost-intensive manner during special production.

The signal transmission element may also be arbitrarily in the form of an antenna for wirelessly transmitting the sensor signal, for example. However, the signal transmission element is expediently a cable. The stated method is particularly favorable here because cables generally greatly load the electrical interface in an unprotected manner. The stated method, during which only the neutral part in which the electrical interface is protected in the protective compound is first of all produced, makes it possible to transport the sensor in this intermediate production state without any problems even when the transmission element is a cable.

After the neutral part has been produced as part of the stated sensor, the neutral part can be transported to a further production site in one development of the stated method, in which case at least one part of the second protective compound is enveloped in a third protective compound there.

In one particular development, this third protective compound can then be formed with a fastening section as a mechanical interface for fastening the sensor to the sensor carrier already mentioned.

The fastening section may comprise, for example, a sleeve which is radially enveloped by the third protective compound.

According to another aspect of the invention, a sensor is produced by means of one of the methods stated.

The stated sensor may be a wheel speed sensor or an inertial sensor for a vehicle.

According to another aspect of the invention, a vehicle comprises a stated sensor.

BRIEF DESCRIPTION OF THE DRAWINGS

The above-described properties, features and advantages of this invention and the manner in which they are achieved will become clearer and more clearly understood in connection with the following description of the exemplary embodiments which are explained in more detail in connection with the drawings, in which.

DETAILED DESCRIPTION OF THE PREFERRED EMBODIMENTS

In the figures, identical technical elements are provided with identical reference symbols and are described only once.

Figure 1:
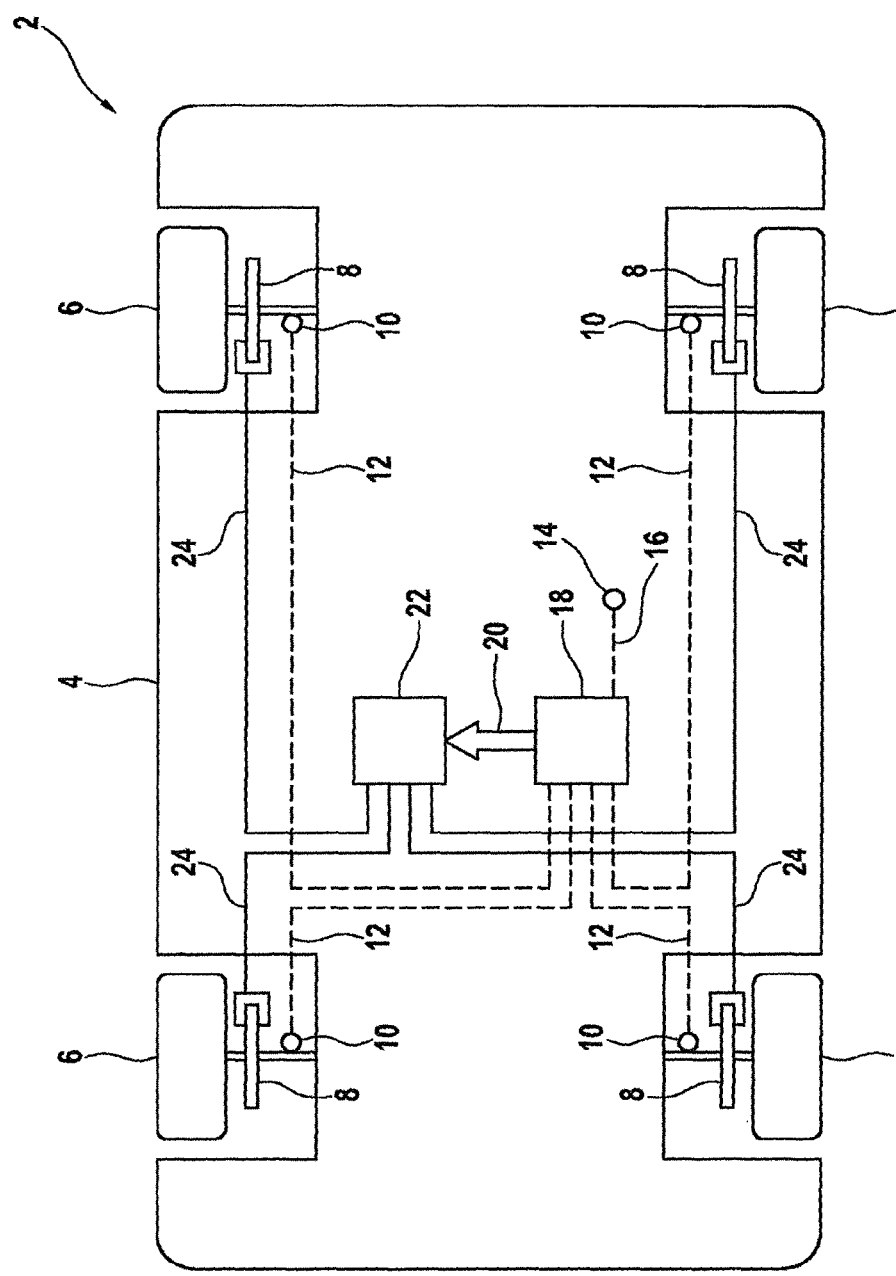
FIG. 1 shows a schematic view of a vehicle having driving dynamics control.

Reference is made to FIG. 1 which shows a schematic view of a vehicle 2 having driving dynamics control which is known per se. Details of this driving dynamics control can be gathered from DE 10 2011 080 789 A1, which is incorporated by reference, for example.

The vehicle 2 comprises a chassis 4 and four wheels 6. Each wheel 6 can be decelerated with respect to the chassis 4 using a brake 8 which is fastened to the chassis 4 in a stationary manner in order to decelerate a movement of the vehicle 2 on a road (not illustrated any further).

In this case, it may happen, in a manner known to a person skilled in the art, that the wheels 6 of the vehicle 2 lose their road grip and the vehicle 2 even moves away from a trajectory predefined using a steering wheel (not shown any further), for example, as a result of understeering or oversteering. This is avoided by means of control circuits which are known per se such as ABS (anti-lock braking system) and ESP (electronic stability program).

In the present embodiment, the vehicle 2 has speed sensors 10 on the wheels 6 for this purpose, which speed sensors record a speed 12 of the wheels 6. The vehicle 2 also has an inertial sensor 14 which acquires driving dynamics data 16 relating to the vehicle 2, from which a pitch rate, a roll rate, a yaw rate, a transverse acceleration, a longitudinal acceleration and/or a vertical acceleration, for example, can be output in a manner known per se to a person skilled in the art.

On the basis of the recorded speeds 12 and driving dynamics data 16, a controller 18 can determine, in a manner known to a person skilled in the art, whether the vehicle 2 is sliding on the road or even deviates from the above-mentioned predefined trajectory and can accordingly react thereto with a controller output signal 20 which is known per se. The controller output signal 20 can then be used by an actuating device 22 to control final controlling elements, such as the brakes 8, which react to the sliding and the deviation from the predefined trajectory in a manner known per se, by means of actuating signals 24.

The controller 18 may be integrated, for example, in an engine controller of the vehicle 2 which is known per se. The controller 18 and the actuating device 22 may also be in the form of a common control device and may be optionally integrated in the above-mentioned engine controller.

The present invention is intended to be explained in more detail using the wheel speed sensor 10 shown in FIG. 1 even though the present invention can be implemented in any desired sensors such as magnetic field sensors, acceleration sensors, rate-of-rotation sensors, structure-borne sound sensors or temperature sensors.

Figure 2:
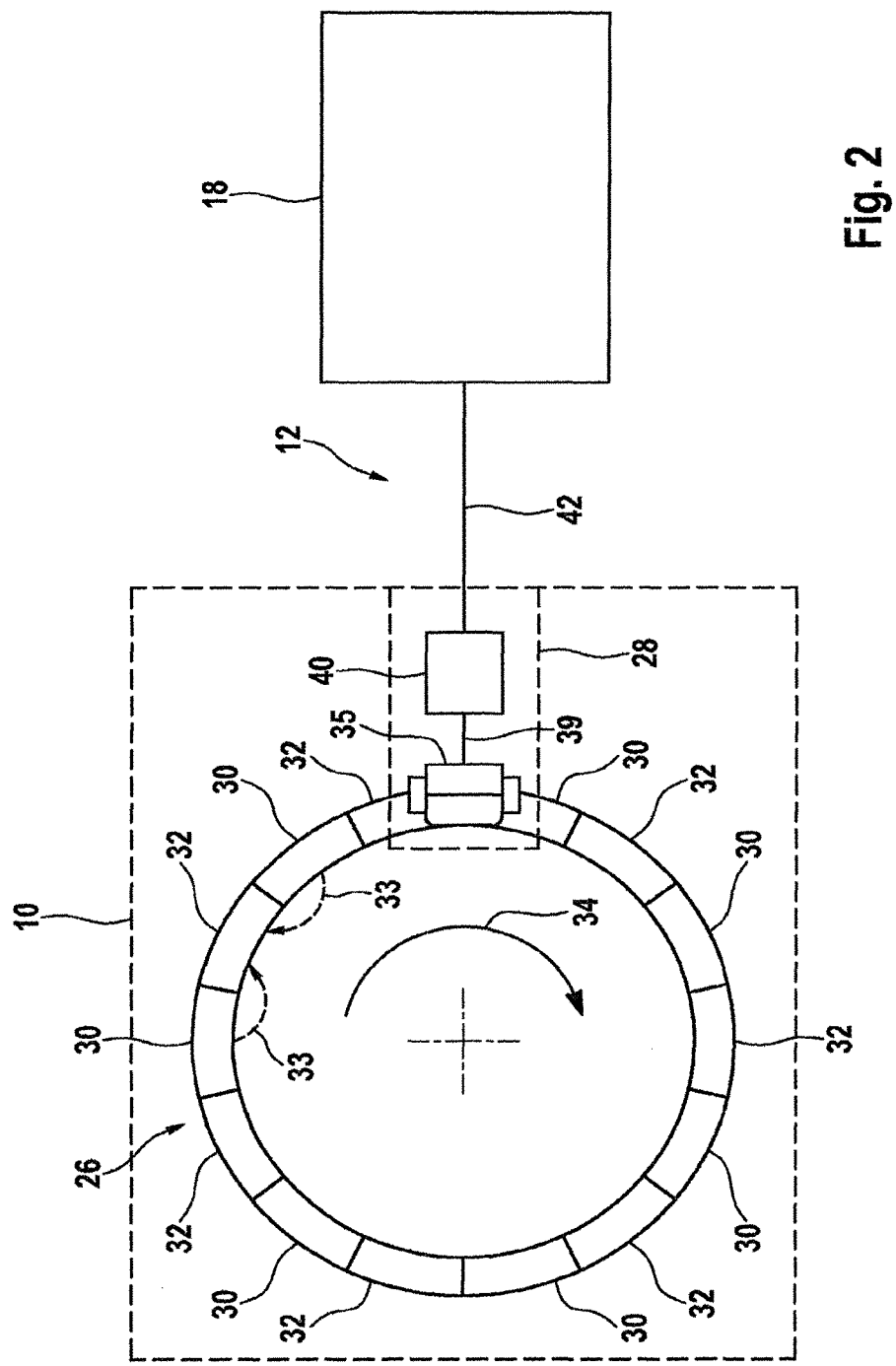
FIG. 2 shows a schematic illustration of a speed sensor in the vehicle from FIG. 1.

Reference is made to FIG. 2 which shows a schematic view of one of the speed sensors 10 in the driving dynamics control from FIG. 1.

In the present embodiment, the speed sensor 10 is in the form of an active speed sensor comprising a transmitter element in the form of an encoder disk 26, which is fastened to the wheel 6 in a rotationally fixed manner, and a sensor circuit which is fastened in a stationary manner with respect to the chassis 4 and is referred to as a reading head 28 below for the sake of simplicity.

In the present embodiment, the encoder disk 26 consists of magnetic north poles 30 and magnetic south poles 32 which are strung together and together excite a physical field in the form of a transmitter magnetic field 33. This transmitter magnetic field is indicated using two dashed field lines for the sake of clarity in FIG. 3. If the encoder disk 26 fastened to the wheel 6 rotates in a direction of rotation 34 with the wheel, the transmitter magnetic field thus concomitantly rotates.

In the present embodiment, the reading head 28 comprises a measuring sensor, also called a measuring pick-up, in the form of a magnetoresistive element 35. The magnetoresistive element 35 changes its electrical resistance on the basis of the angular position of the transmitter magnetic field 33 excited by the encoder wheel 26. In order to record the speed 12, a test signal 39 is applied to the magnetoresistive element 35, which test signal is changed on the basis of the angular position of the encoder wheel 26 and therefore the electrical resistance of the magnetoresistive element 35. A signal evaluation circuit 40 evaluates the speed 12 on the basis of this change in the test signal 39 and outputs it to the controller 18 in a data signal 42. This signal evaluation circuit 40 may likewise be part of the reading head 28 in the form of an application-specific integrated circuit (called ASIC). However, instead of the magnetoresistive element 35, any desired measuring pick-up which is able to output a signal on the basis of a magnetic field can be used to record the rotating transmitter magnetic field 33, for example a Hall element as well.

In this respect and with respect to further background information relating to active wheel speed sensors, reference is made to the relevant prior art, for example DE 101 46 949 A1, which is incorporated by reference.

Figure 3:
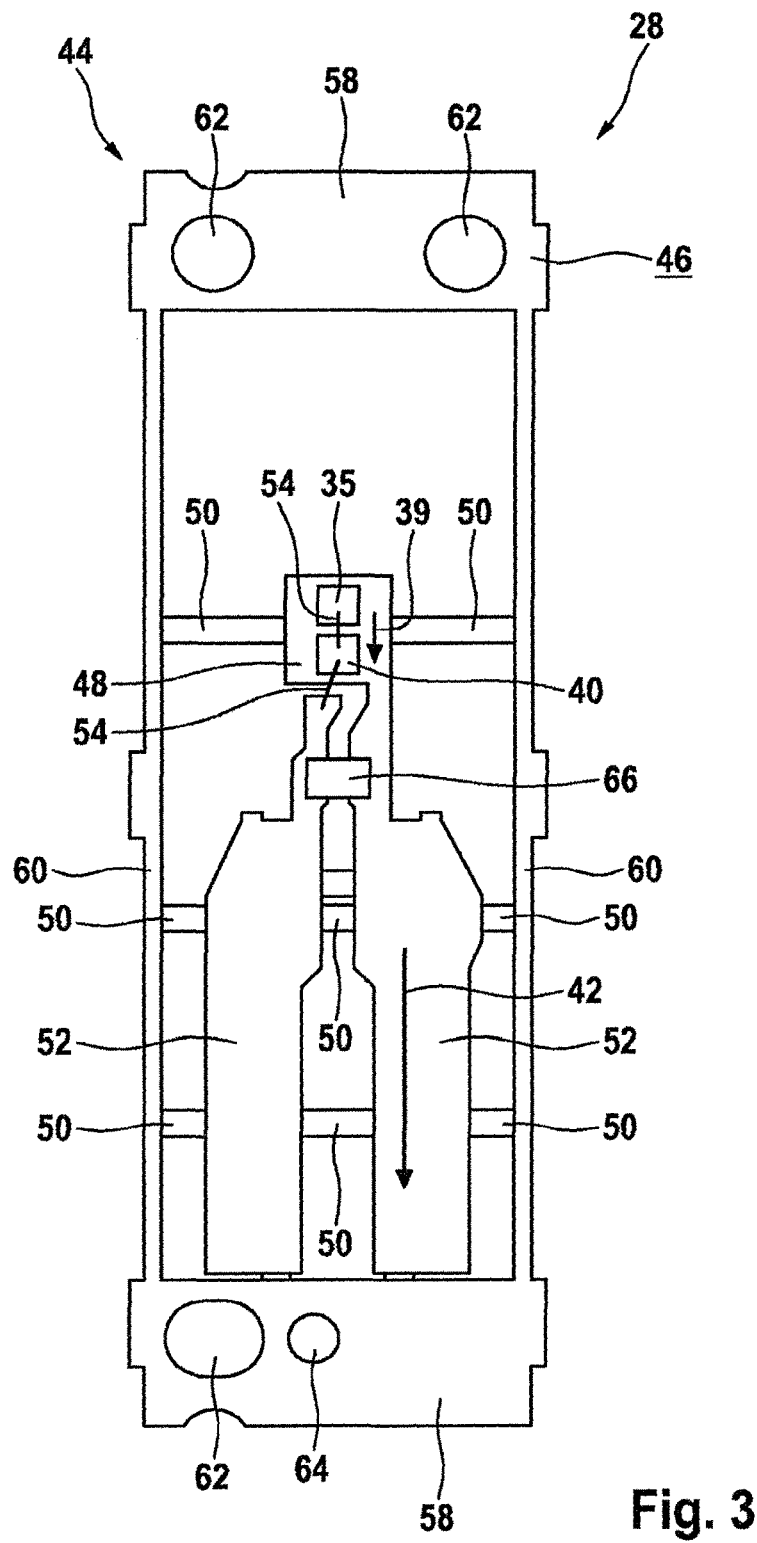
FIG. 3 shows a schematic illustration of a reading head of the speed sensor from FIG. 2 in a first intermediate production state.

Reference is made to FIG. 3 which shows a schematic illustration of the reading head 28 for the speed sensor 10 in a first intermediate production state.

Figure 4:
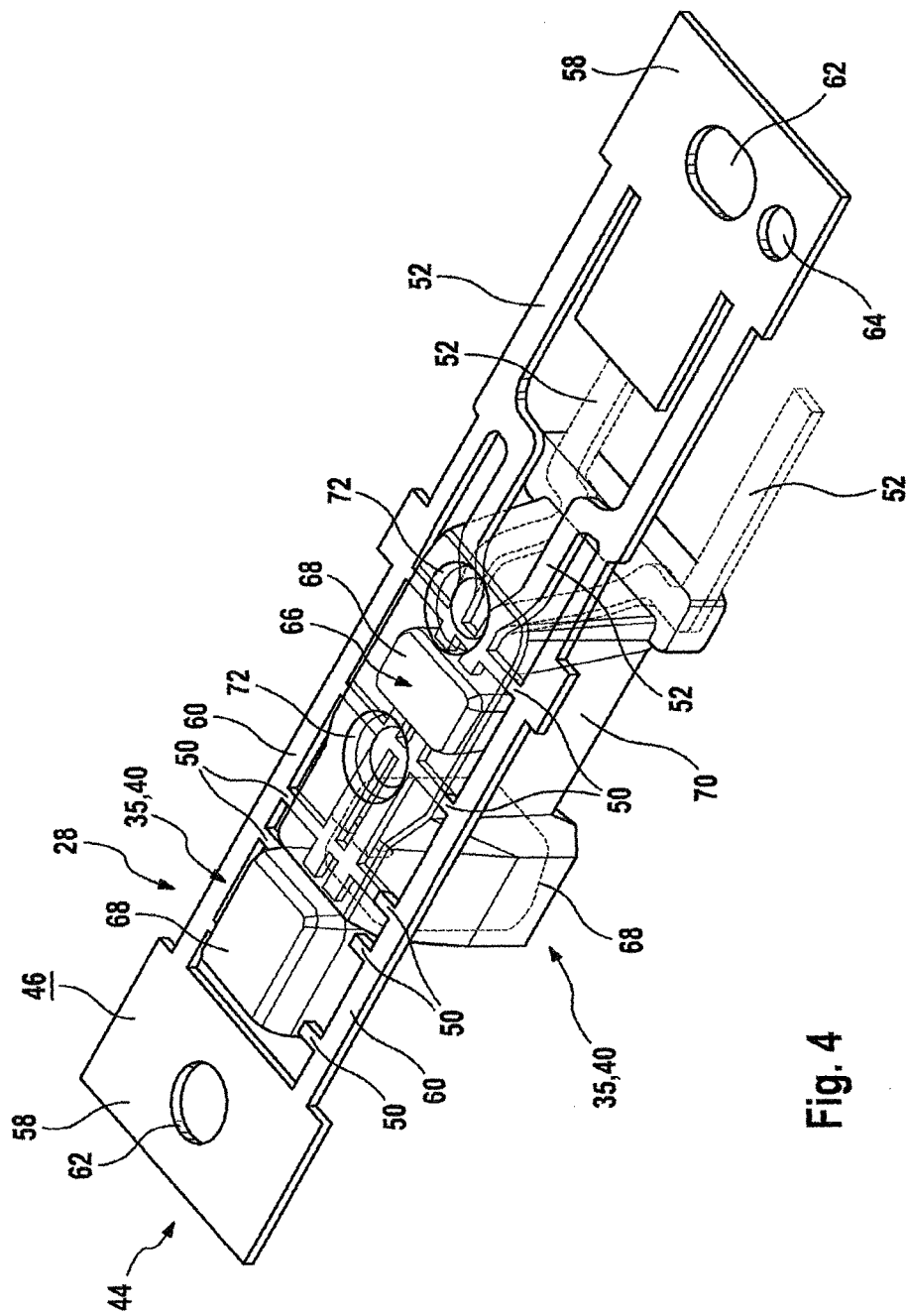
FIG. 4 shows a schematic illustration of the reading head of the speed sensor from FIG. 2 in a second intermediate production state.

The reading head 28 in the present embodiment is held on a circuit carrier in the form of a so-called leadframe 44. Only a part of this leadframe 44 is shown in FIG. 3. The leadframe 44 may be particularly preferably in the form of an endless belt which is adjoined, beside one another and/or above one another, by that part of the leadframe 44 which is shown in FIG. 3. An example of this is shown in FIG. 4.

That part of the leadframe 44 which is shown in FIG. 3 comprises a holding frame 46, a wiring carrier in the form of a placement island 48 on which the reading head 28 is held and connected, two webs called tie-bars 50 and two contact connections 52. In this case, the tie-bars 50 hold the contact connections 52 directly and hold the placement island 48 on the holding frame 46. In the leadframe 44, the holding frame 46, the placement island 48, the tie-bars 50 and the contact connections 52 are in the form of an integral punched part or punched frame in which the above-mentioned elements are formed by punching from an electrically conductive metal sheet.

Within the scope of the present embodiment, the measuring pick-up in the form of the magnetoresistive element 35 and the signal evaluation circuit 40 are applied to the placement island 48 and electrical contact is made with them by means of soldering or adhesive bonding, for example. The magnetoresistive element 35 and the signal evaluation circuit 40 are also connected to one another in this case via a bonding wire 54, with the result that the test signal 39 can be transmitted between the magnetoresistive element 35 and the signal evaluation circuit 40 via the placement island 48 and the bonding wire 54.

In the present embodiment, the placement island 48 is directly connected to one of the two contact connections 52, while the other of the two contact connections 52 is DC-isolated from the placement island 48 and is connected to the signal evaluation circuit 40 via a further bonding wire 54. This makes it possible to output the data signal 42 from the signal evaluation circuit 40 via the two contact connections 52. In order to filter undesirable external signals from and/or into the reading head 28, a passive filter component 66 can be connected between the contact connections 52. A plurality of passive filter components 66 may also be connected depending on the type of sensor and the number of contact connections 52.

Within the scope of the present embodiment, the holding frame 46 has two transport strips 58 which run parallel to one another and are connected to one another via connecting webs 60. Transport holes 62 are formed in this case on the transport strip 58, in which transport holes a transport tool (not illustrated any further) can engage and can move the leadframe 44. An index hole 64 is also formed on the transport strip 58 and can be used to determine and therefore control the position of the leadframe 44 during transport.

In a manner not illustrated any further, a part of the leadframe 44 may be in the form of a protective plate. This protective plate could be used for heat insulation of the reading head 28 during the enclosing process yet to be described below, as a mechanical fastening area for the reading head 28 (by means of adhesive), as a pressure-exerting abutment for the reading head 28 during the enclosing process yet to be described below, as a heat dissipation plate during operation and as an EMC shield for the reading head 28.

Reference is made to FIG. 4 which shows a further intermediate production state of the reading head 28 after the intermediate production state in FIG. 3. Although the leadframes 44 in FIG. 3 and FIG. 4 differ in terms of their design, they are technically functionally identical. The main difference between FIG. 3 and FIG. 4 is that more tie-bars 50 are present in the leadframe 44 in FIG. 4.

After the production state in FIG. 3 has been reached and the passive filter element 66 has been connected, the placement island 48, with the components 35, 40 carried thereon, and optionally the passive filter component 66 may each be enclosed in a first protective compound 68, for example made from a thermosetting molding compound, in a manner known per se. For this purpose, it is possible to use, for example, so-called molding during which a thermosetting plastic compound is pressed into a special mold around the circuit carrier. An epoxy resin, for example, can be used as the thermosetting plastic compound. A material having properties which exerts only a small amount of stress on the electrical components 35, 40, 66 with simultaneously good adhesion to the leadframe 44 should generally be selected.

A magnet (not illustrated any further) which can be used, for example, as a supporting magnet within the scope of barber pole technology can also be included in the first protective compound 68. Alternatively, the magnet could also be adhesively bonded to the first protective compound 68 after being enclosed in the latter.

Furthermore, outwardly projecting carrying webs could also be included or molded in the first protective compound 68. These could be used to fix the reading head 28 during further production. The carrying webs support the reading head, in particular, in situations in which a large magnet is held in or on the first protective compound 68, which magnet could result in gravity-induced bending. If the carrying webs are made of an electrically conductive material, it should be ensured that they do not have any electrical contact with the electrical components of the reading head 28.

After being enclosed in the first protective compound 68, the placement island 48 enclosed together with the components 35, 40 can be partially punched free and therefore separated from the holding frame 46 by separating the corresponding tie-bars 50. The contact connections 52 can also be partially punched free in the same manner. All other elements of the reading head 28 initially remain connected to the holding frame 46 via the tie-bars 50 in this production state.

The placement island 48 enclosed together with the components 35, 40 and punched free and the contact connections 52 which have been punched free can now be optionally bent away from the reading head 28 partially punched free in this way in the manner shown in FIG. 4. In this case, the placement island 48 which has been enclosed together with the components 35, 40, has been punched free and has been bent away is illustrated in purple or using dotted lines and the contact connections which have been punched free and bent away are illustrated in purple/orange or using dotted lines.

After the bending process, the reading head 28 which is still partially held on the holding frame 46 is enclosed in an intermediate protective compound 70 and is then completely punched free from the holding frame 46. The enclosing operation can be carried out as part of a molding process described above in which a thermosetting material can likewise be used as the material for the intermediate protective compound 70. The intermediate protective compound 70 ensures, in particular, that the bent reading head is held in a stable manner.

Depending on the reading head 28, a calibration can be carried out in the state completely held in the leadframe 44, in the partially punched-free state or else in the punched-free state. A punching-free operation only immediately before the calibration entails the advantage that the production tolerances are very low and are also very reproducible. In a particularly favorable manner, the punching-free of the reading head 28 in the intermediate production state in FIG. 4 should also be carried out in two steps. After the first punching step, the supply and signal lines are enabled and electrical contact can be made with them. In this case, the test or adjustment/calibration can also be carried out in the leadframe 44, which entails advantages in terms of handling and positioning. The complete punching-free from the holding frame 46 and possibly supply pins (not referenced any further) (preferably a ground pin) is only then carried out.

The traceability of the reading head 28 can be ensured by applying a consecutive serial number to the leadframe 44

(for example a data matrix code) at the beginning of the production process. The production history (time stamps, installation numbers, process measured values, calibration values, test results, etc.) and the serial number of the reading head 28 can be stored under this serial number. This serial number can be stored in a non-volatile memory (not illustrated any further) of the reading head 28 immediately after the punching-free operation. This serial number can additionally be applied to the surface of the reading head 28 in any desired intermediate production state or final state of the reading head 28. In the case of complaints, affected ranges of numbers can be limited and handled separately. In addition, the process and material optimization can be effectively operated using statistical data evaluation.

Figure 5:
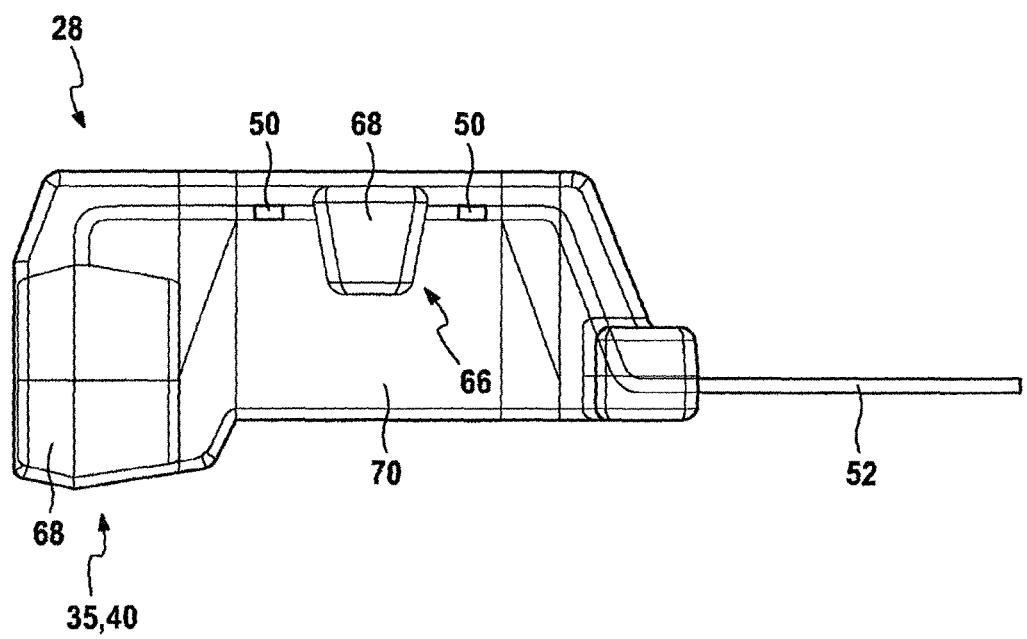
FIG. 5 shows a schematic illustration of the reading head of the speed sensor from FIG. 2 in a third intermediate production state.

The result after the complete punching-free operation is illustrated in FIG. 5. It is noted at this juncture that the enclosing in the intermediate protective compound 70 can be dispensed with if the reading head 28 is not, as shown in FIG. 4, bent at its leadframe 44.

Recesses 72 shown in FIG. 6 or else troughs are formed in the intermediate protective compound 70 and/or optionally in the first protective compound 68 of the reading head 28 in the production state in FIGS. 4 and 5, which recesses or troughs are discussed in more detail at a later point. The recesses 72 may be formed as part of the above-mentioned forming process. It goes without saying, however, that the recesses 72 may also be subsequently formed, in principle. The recesses 72 could also be in the form of eyelets, for example, in the leadframe 44, in principle.

Furthermore, further contours for secure handling during production may be provided, for example flat surfaces as a possibility for gripping a suction nozzle or contours for a gripper.

Figure 6:
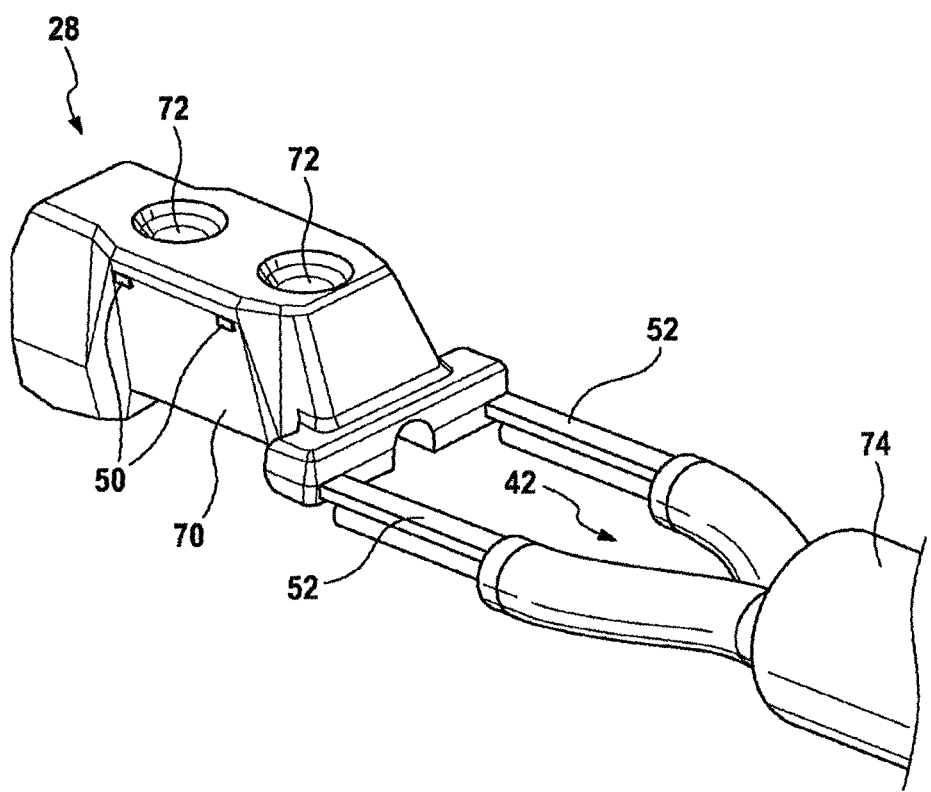
FIG. 6 shows a schematic illustration of the reading head of the speed sensor from FIG. 2 in a fourth intermediate production state.

Furthermore, skirts may be formed on the side of the reading head 28 in the intermediate production state in FIG. 5 or 6, which skirts effect lateral adjustment, heat protection, mechanical protection against the flow pressure of the intermediate protective compound 70 and/or of the first protective compound 68, and fixing of the reading head 28 in the case of possibly introduced slots.

In order to stabilize any possible welding conditions, a bead may be embossed, preferably in the carrier leadframe. The bead may have the form of a round dome or a longitudinal web.

A signal transmission element in the form of a data cable 74 is connected to the contact connections 52 after the enclosing with the intermediate protective compound 70, as illustrated in FIG. 6. This can be carried out in any desired manner such as crimping, welding, soldering, splicing, adhesive bonding or the like.

If the intermediate protective compound 70 and/or the first protective compound 68 has/have been molded, a so-called flash may form at a sealing edge of the shells of the mold in the case of tolerance fluctuations of the material of the leadframe 44. This flash can be mechanically removed by means of brushes or by means of an air jet stream or by means of a laser.

After this, the reading head 28 is enclosed in a second protective compound 78 in the intermediate production state in FIG. 6. This second protective compound 78 may be a thermoplastic, for example. In this case, the enclosing in the second protective compound can be carried out as part of a forming process, for example injection molding. In this case, a thermoplastic such as a liquid crystal polymer (called LCP), a polyphenylene sulfide (called PPS), a polyamide (called PA) or a polybutylene terephthalate (called PBT) could be used as the material. When choosing the material, a low coefficient of thermal expansion, chemical resistance, mechanical strength and tightness are in the foreground. In principle, however, the enclosing operation could also be carried out as part of a molding operation and a thermosetting material could again be chosen as the material for the second protective compound 78.

Figure 7:
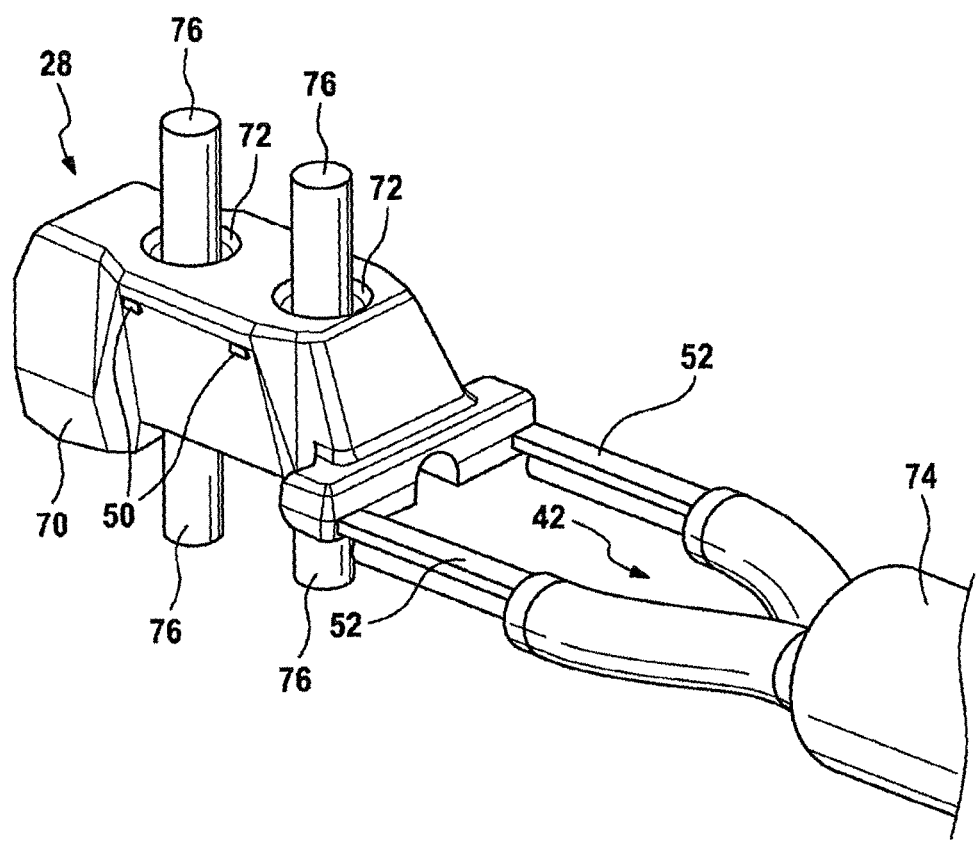
FIG. 7 shows a schematic illustration of the reading head of the speed sensor from FIG. 2 in a fifth intermediate production state.

For the enclosing in the second protective compound, carrying pins 76 are inserted into the recesses 72, as shown in FIG. 7, at which carrying pins the reading head 28 is held during enveloping with the second protective compound 78. As a result of the carrying pins 76, the sensor head 28 is not only protected during enclosing with the second protective compound 78 but is also oriented in a particular direction. After the enclosing operation, the carrying pins 76 are removed again, with the result that the recesses 72 remain not only in the intermediate protective compound 70 or the first protective compound 68 but also in the second protective compound 78. Geometries which extend the gap, such as an uneven surface of the first protective compound 68 or of the intermediate protective compound 70, may possibly be formed between the first protective compound 68 or the intermediate protective compound 70 and the second protective compound 78 in order to extend the path for moisture which enters the recesses 72 and therefore enters between the adjacent compounds 68, 70, 78.

Figure 8:
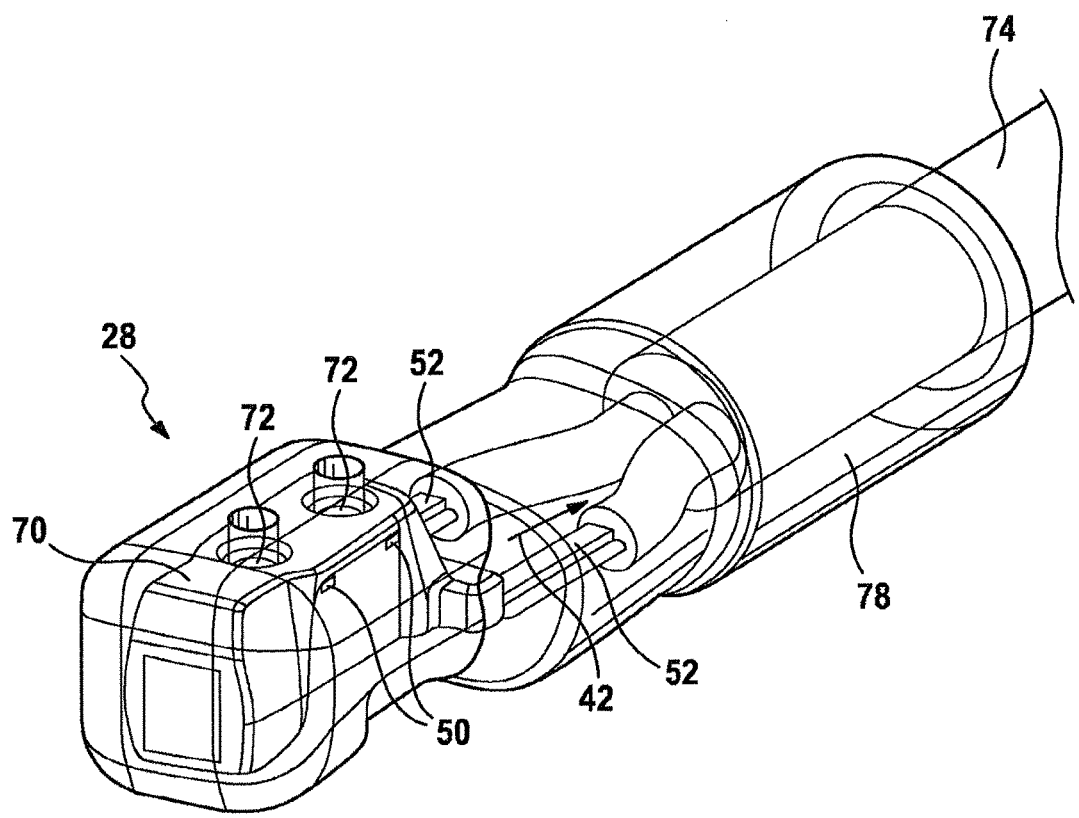
FIG. 8 shows a schematic illustration of the reading head of the speed sensor from FIG. 2 in a sixth intermediate production state.

In the intermediate production state in FIG. 8, the sensor head 28 is already electrically fully functional and could be connected to a superordinate electronic device, for example the controller 18. However, in order to install the sensor head 28 in the vehicle 2, a mechanical interface must also be provided in order to fasten the sensor 2 to the chassis 4. However, this mechanical interface is dependent on the installation space of the vehicle 2. From an electrical point of view, the sensor head 28 in the intermediate production state in FIG. 8 can be used in any desired vehicle 2, in principle, and is therefore intended to be referred to as a so-called neutral part.

This neutral part can be transported, stored or sold in any desired manner. It can then be adapted to the installation space of the vehicle 2 in a simple manner by adding a mechanical interface 80 illustrated by way of example in FIG. 9.

Figure 9:
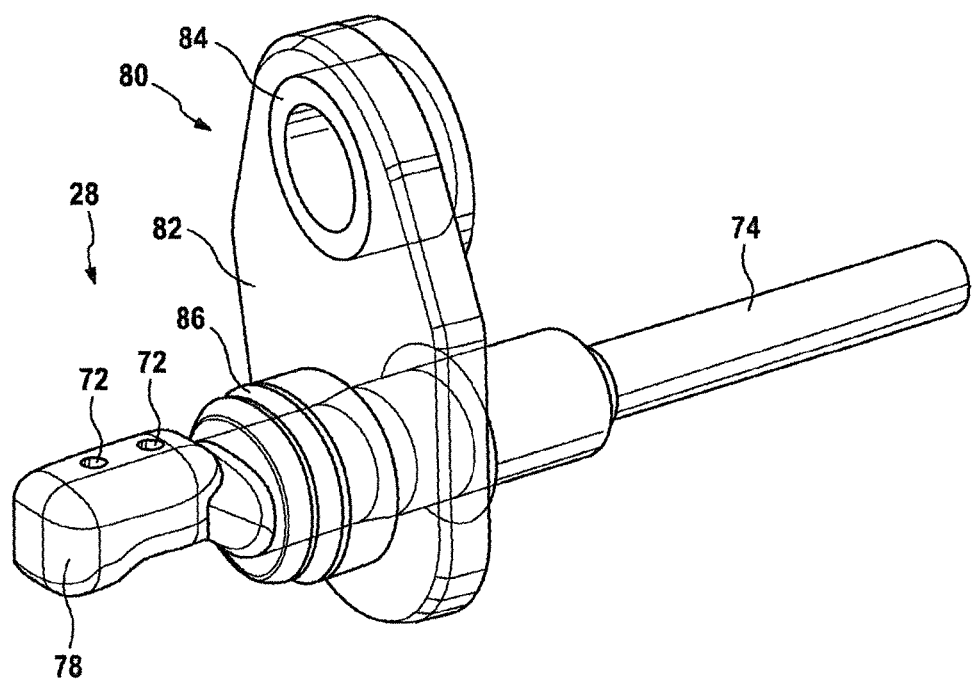
FIG. 9 shows a schematic illustration of the reading head of the speed sensor from FIG. 2 in a seventh intermediate production state.

As shown in FIG. 9, a third protective compound 82 is formed on the neutral part from FIG. 8 for this purpose by means of a forming method, for example an injection molding method. A sleeve 84 is formed in this third protective compound 82 and can subsequently be used to guide a fastening means, for example a screw, for fastening the reading head 28 to the vehicle 2. A clamp 86 may also be placed around the formed third protective compound 82, which clamp increases the mechanical hold of the third protective compound 82 on the neutral part from FIG. 8.

Figure 10:
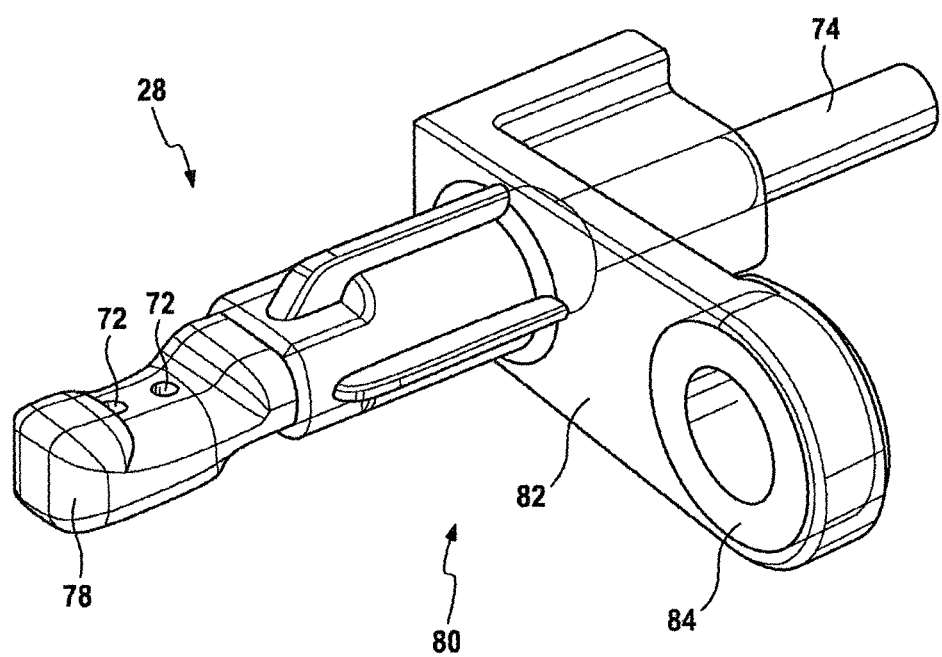
FIG. 10 shows a schematic illustration of the reading head of the speed sensor from FIG. 2 in an eighth intermediate production state.

FIG. 10 shows an alternative possibility for forming the mechanical interface 80.

The invention claimed is:

1. A method for producing a sensor having a circuit carrier, which has a placement island carrying a sensor circuit for outputting a sensor signal dependent on a physical transmitter field and an interface which is electrically connected to the placement island and is intended to transmit the sensor signal to a superordinate signal processing device, comprising:
   enveloping, in a first protective compound, i) at least a part of the circuit carrier containing the placement island and ii) the sensor circuit,
   connecting a signal transmission element to the interface, and enveloping i) at least one part of the first protective compound and ii) the interface, with at least one part of the signal transmission element connected thereto, in a second protective compound.

2. The method as claimed in claim 1, further comprising forming the second protective compound without a fastening section for fastening the sensor to a sensor carrier.

3. The method as claimed in claim 2, the signal transmission element being a cable.

4. The method as claimed in claim 1, the signal transmission element being a cable.

5. The method as claimed in claim 1, further comprising:
    enveloping at least one part of the second protective compound in a third protective compound.

6. The method as claimed in claim 5, further comprising forming the third protective compound with a fastening section for fastening the sensor to a sensor carrier.

7. The method as claimed in claim 6, the fastening section comprising a sleeve which is radially enveloped by the third protective compound.

8. A sensor which is produced by a method as claimed in claim 1.

9. A vehicle comprising a sensor as claimed in claim 8.

* * * * *